United States Patent
Hoshida (10) Patent No.: US 8,014,685 B2
(45) Date of Patent: Sep. 6, 2011

(54) COHERENT OPTICAL RECEIVER

(75) Inventor: Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 633 days.

(21) Appl. No.: 11/905,148

(22) Filed: Sep. 27, 2007

(65) Prior Publication Data

US 2008/0145066 A1 Jun. 19, 2008

(30) Foreign Application Priority Data

Dec. 15, 2006 (JP) ................................ 2006-338606

(51) Int. Cl.
*H04B 10/06* (2006.01)
(52) U.S. Cl. ........ 398/205; 398/202; 398/204; 398/206; 398/213; 398/152
(58) Field of Classification Search .................. 398/152, 398/202–214
See application file for complete search history.

(56) References Cited

U.S. PATENT DOCUMENTS

| 5,060,312 A | * | 10/1991 | Delavaux | 398/204 |
| 5,140,453 A | | 8/1992 | Tsushima et al. | |
| 5,272,556 A | * | 12/1993 | Faulkner et al. | 398/71 |
| 5,301,053 A | | 4/1994 | Shikada | |
| 5,352,885 A | * | 10/1994 | Niki | 250/214 R |
| 5,548,434 A | * | 8/1996 | Shimonaka et al. | 398/162 |
| 7,149,435 B2 | * | 12/2006 | Kuri et al. | 398/204 |
| 2004/0114939 A1 | * | 6/2004 | Taylor | 398/152 |
| 2004/0126108 A1 | * | 7/2004 | Chung et al. | 398/26 |

FOREIGN PATENT DOCUMENTS

| JP | 2-67831 | | 3/1990 |
| JP | 4-335724 | A | 11/1992 |
| JP | 2007-049597 | A | 2/2007 |
| WO | WO 2004/054138 | | 6/2004 |

OTHER PUBLICATIONS

Extended European Search Report, mailed Apr. 16, 2008 and issued in corresponding European Patent Application No. 07019039.2-2415.
Patent Abstract of Japan, publication No. 02-67831, publication date Mar. 7, 1990.
D.-S. Ly-Gagnon et al., "Unrepeated 210-km Transmission with Coherent Detection and Digital Signal Processing of 20-Gb/s QPSK signal", Optical Fiber Communication Conference, 2005, Technical Digest. OFC.NFOEC, USA, 2005, vol. 2, OTuL4.

(Continued)

*Primary Examiner* — Li Liu
(74) *Attorney, Agent, or Firm* — Fujitsu Patent Center (57) ABSTRACT

A coherent optical receiver of the invention combines local oscillator light having orthogonal polarization components in which the optical frequencies are different to each other, and received signal light, in an optical hybrid circuit, and then photoelectrically converts this in two differential photodetectors. Then this is converted to a digital signal in an AD conversion circuit, and computation processing is executed in a digital computing circuit using the digital signal, to estimate received data. At this time, the optical frequency difference between the orthogonal polarization components of the local oscillator light is set so as to be smaller than two times the signal light band width, and larger than a spectrum line width of the signal light source and the local oscillator light source. As a result, it is possible to realize a small size polarization independent coherent optical receiver that is capable of receiving high speed signal light.

5 Claims, 6 Drawing Sheets

OTHER PUBLICATIONS

Japanese Office Action mailed Jun. 2, 2009 and issued in corresponding Japanese Patent Application 2006-338606.

F. Derr, "Coherent optical QPSK intradyne system: Concept and digital receiver realization", Journal of Lightwave Technology. vol. 10, No. 9, p. 1290-1296, Sep. 1992.

L. G. Kazovsky, "Phase-and polarization-diversity coherent optical techniques", Journal of Lightwave Technology, vol. 7, No. 2, p. 279-292, Feb. 1989.

A. D. Kersey et al., "New polarisation-insensitive detection technique for coherent optical fibre heterodyne communications", Electronics Letters, vol. 23, p. 924-926, Aug. 27, 1987.

David A. Smith et al., "Integrated-Optic Acoustically-Tunable Filters for WDM Networks" IEEE Journal on Selected Areas in Communications. vol. X. No. 6. Aug. 1990. pp. 1150-1159.

U. Koc, A. Leven, Y. Chen and N. Kaneda "Digital Coherent Quadrature Phase-Shift Keying (QPSK)" Bell Laboratories, Lucent Technologies, 600 Mountain Ave., Murray Hill, NJ 07974. 2006 Optical Society America (3 pages).

"Chinese Office Action", mailed by Chinese Patent Office corresponding to Chinese application No. 200710181941.X on Apr. 29, 2010, with English translation.

State Intellectual Property Office of China: "Chinese Office Action", issued Nov. 22, 2010 in corresponding Chinese Patent Application No. 200710181941.X, with English-language translation.

Japan Patent Office, Office Action mailed May 10, 2011, in connection with JP-2009-178500, which is a foreign corresponding application of U.S. Appl. No. 11/905,148; English-language translation provided herewith.

* cited by examiner

RELATED ART

FIG.9

RELATED ART

FIG.10

RELATED ART

COHERENT OPTICAL RECEIVER

BACKGROUND OF THE INVENTION

1. Field of the Invention

The present invention relates to an optical receiver used in an optical transmission system, and in particular to an optical receiver of a coherent receiver type that does not depend on the polarization state of the signal light.

2. Description of the Related Art

In order to realize a super high-speed optical transmission system of 40 gigabits per second (Gbit/s) or above, a transceiver of a RZ-DQPSK (Return-to-Zero Differential Quadrature Phase Shift Keying) modulation format has been developed. From now on, it is desired to still more improve the optical noise immunity of the RZ-DQPSK transceiver, and to miniaturize the optical variable dispersion compensator that occupies a large size, by for example substituting by strong electrical signal processing. As a means for realizing this, for example it is hoped to adopt a coherent receiving method of for example a homodyne type, an intradyne type, or a heterodyne type, and this is being examined (for example refer to F. Derr, "Coherent optical QPSK intradyne system: Concept and digital receiver realization", Journal of Lightwave Technology. Vol. 10, No. 9, p. 1290-1296, September 1992). By employing the coherent-type receiver, the optical noise immunity is improved by approximately 3 dB, and compared to delayed direct detection, it is considered that the compensation capability of the wavelength dispersion distortion due to electrical signal processing after photoelectric conversion is markedly increased.

However, in the abovementioned coherent optical reception system, there is an inherent problem in that if the polarization state of the local oscillator light output from the local oscillator light source contained in the optical receiver is orthogonal to the polarization state of the received signal light, it cannot be received. The polarization state of the received signal light propagated on the optical transmission path, continuously changes due to the state of the optical transmission line. Therefore a scheme for solving the above problem is important.

As a conventional technique for overcoming the polarization dependency of the coherent optical receiver, for example there is known methods such as those shown next (for example refer to L. G. Kazovsky, "Phase- and polarization-diversity coherent optical techniques", Journal of Lightwave Technology, Vol. 7, No. 2, p. 279-292, February 1989, and A. D. Kersey et al., "New polarisation-insensitive detection technique for coherent optical fibre heterodyne communications", Electronics Letters, Vol. 23, p. 924-926, Aug. 27, 1987.).

(I) A method which employs an endlessly tracking automatic polarization controller that enables a control so as to have the polarization state of continually receiving signal light and that of the local oscillator light close to each other.

(II) A method that uses a polarization diversity light reception front end in which a phase hybrid circuit and a photoelectric conversion section are duplicated.

(III) A method that employs polarization multiplexed light as the local oscillator, where the local oscillator light which has mutually orthogonal polarization components and the optical frequency of one of the polarization components is shifted to approximately two times or more than a signal band width, and performs coherent reception and detection for each of the polarization components by performing signal separation in frequency domain after photoelectric conversion.

However, in the above such conventional techniques, there is a problem in that it is difficult to realize coherent optical receivers that are small size, polarization independent, and capable of receiving very high-speed modulated signal light such as 40 Gbit/s. That is to say, to realize the above-mentioned method of (I), an endlessly tracking automatic polarization controller is necessary, and hence miniaturization is difficult. Furthermore, to realize the above-mentioned method of (II), a large scale light receiving front end circuit of more than twice the size is necessary, and hence miniaturization is difficult. Moreover, to realize the abovementioned method of (III), an electronic circuit having a wide band light receiving band of more than thrice the size with respect to the signal band width is necessary, and hence it is difficult to deal with signal light of a high bit rate.

Here the problem of the abovementioned method of (III) is specifically described.

Figure 8:
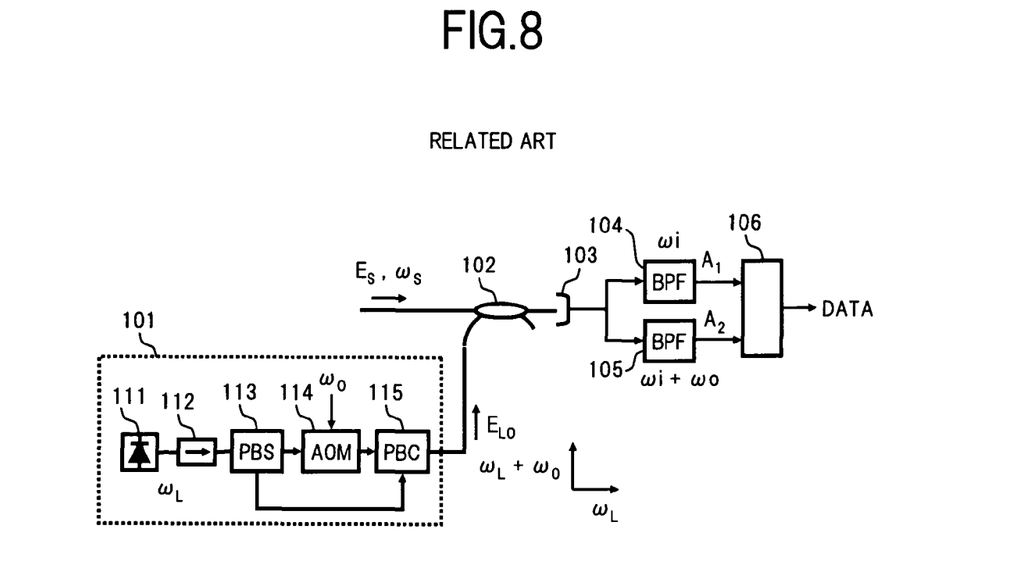
FIG. 8 is a block diagram showing a configuration example of a conventional coherent optical receiver.
Figure 9:
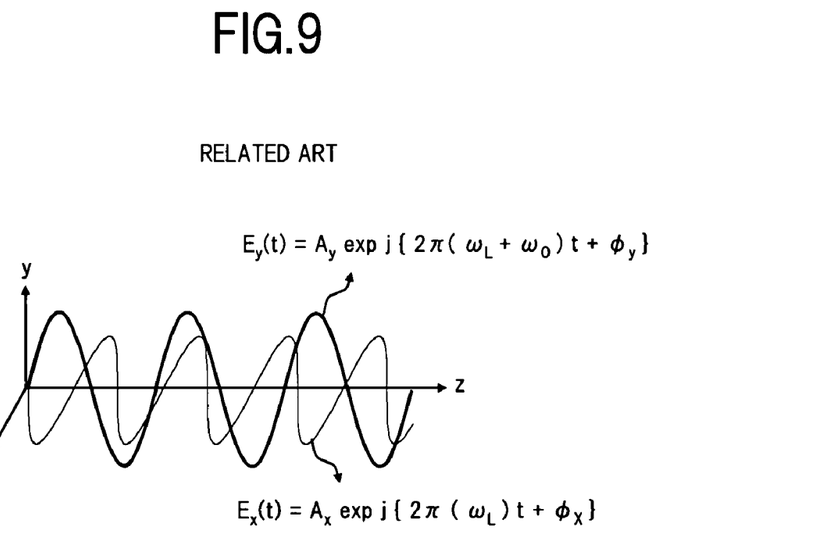
FIG. 9 is a concept diagram showing an orthogonal polarization component of a local oscillator light in the conventional coherent optical receiver.

FIG. 8 is a diagram showing a configuration of a coherent optical receiver to which the method of (III) is applied. In this conventional coherent optical receiver, in a local oscillator light generating section 101, light of an optical angular frequency $\omega_L$ output from a light source 111 is applied to a polarization beam splitter (PBS) 113 via an optical isolator 112, and separated into orthogonal polarization components. Then, one of the polarization components is input to an acousto-optic modulator (AOM) 114 and the optical angular frequency is shifted by $\omega_O$. This polarization component with an optical angular frequency $\omega_L+\omega_O$, and the other polarization component which is separated by the PBS 113, are then combined in a polarization beam combiner (PBC) 115. As a result, for example as shown in the concept diagram of FIG. 9, a local oscillator light $E_{LO}$ for which the polarization component of the optical angular frequency $\omega_L$ ($E_x(t)$ component in the figure) and the polarization component of the optical angular frequency $\omega_L+\omega_O$ orthogonal to this ($E_y(t)$ component in the figure) are polarization multiplexed is generated.

The local oscillator light $E_{LO}$ output from the local oscillator light generating section 101 is combined with the received signal light $E_S$ having an optical angular frequency $\omega_S$ in a multiplexer 102, and then received by a photodetector 103 and converted into an electrical signal. This electrical signal includes a signal component $A_1$ of an intermediate frequency $\omega_i$ due to the beat of the polarization component of the optical angular frequency $\omega_L$ included in the local oscillator light $E_{LO}$, and the received signal light $E_S$, and a signal $A_2$ of an intermediate frequency $\omega_i+\omega_O$ due to the beat of the polarization component of the optical angular frequency $\omega_L+\omega_O$ included in the local oscillator light $E_{LO}$, and the received signal light $E_S$. Therefore by applying the output signal of the photodetector 103 to each of the bandpass filters (BPF) 104 and 105, the respective intermediate frequency signals $A_1$ and $A_2$ are separated corresponding to the frequencies. Then, by inputting the respective intermediate frequency signals $A_1$ and $A_2$ to a reception electronic circuit 106, and executing necessary signal processing, the received data DATA is regenerated.

Figure 10:
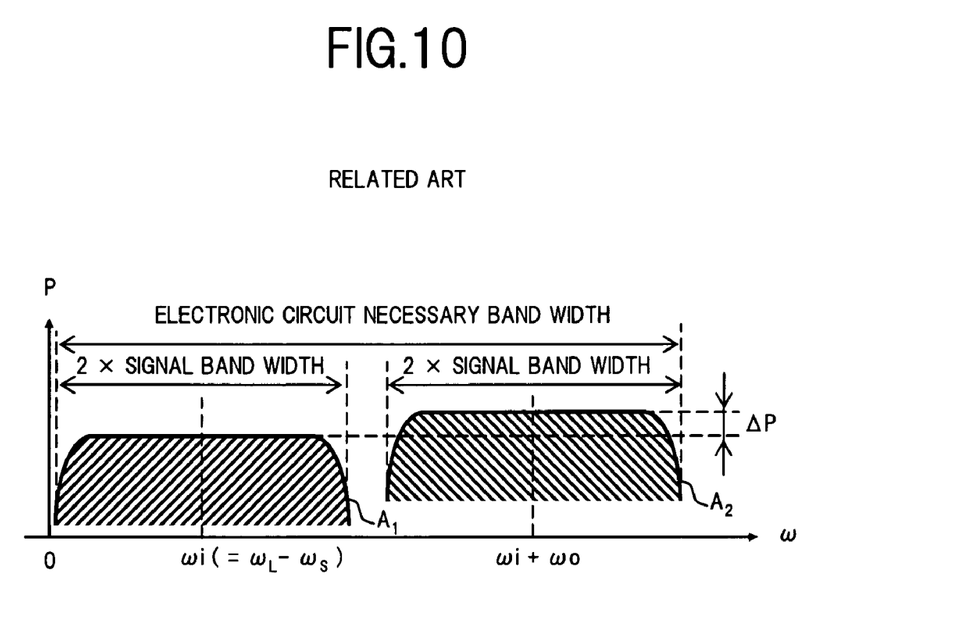
FIG. 10 is a diagram schematically showing an electrical spectrum of an intermediate frequency signal in the conventional coherent optical receiver.

At this time, the intermediate frequency signals $A_1$ and $A_2$ input to the reception electronic circuit 106 come to have an electric spectrum such as shown for example in the schematic view of FIG. 10. More specifically, the intermediate frequency signal $A_1$ has a spectral width of approximately 2 times the signal band width centered in the frequency $\omega_i$, and the intermediate frequency signal $A_2$ has a spectral width of approximately 2 times the signal band width centered on the frequency $\omega_i+\omega_O$. Furthermore, a difference $\Delta P$ of the power of the intermediate frequency signals $A_1$ and $A_2$ changes depending on the polarization state and the like of the received signal light. Therefore, the band width of the reception electronic circuit 106, in the example of FIG. 10, must be 4 times or more the signal band width. In the case where the optical angular frequency ω of the local oscillator light is set so that the intermediate frequency $\omega_i$ becomes 0 Hz, the band width of the reception electronic circuit 106 becomes close to 3 times the signal band width.

Consequently, in the conventional coherent optical receiver to which the method of (III) is applied, an electronic circuit having 3 times or more the signal band width with respect to the signal light of for example 40 Gbit/s, that is to say a band width of 120 GHz or more is necessary, and for high speed signal light of 40 Gbit/s or more, realization of this is extremely difficult.

SUMMARY OF THE INVENTION

The present invention focuses on the problems mentioned above, and has an object of providing a small size polarization independent optical receiver that is capable of receiving high speed signal light by a coherent reception method.

In order to achieve the above object, the present invention is an optical receiver that reception processes signal light by a coherent reception system, and comprises: a local oscillator light generating section that generates local oscillator light having orthogonal polarization components in which the optical frequencies are different to each other; a combining section that combines received signal light and local oscillator light output from the local oscillator light generating section, and outputs this; a photoelectric conversion section that converts the light output from the combining section into an electrical signal; an AD conversion section that converts the electrical signal output from the photoelectric conversion section into a digital signal; a digital computing section that uses a digital signal output from the AD conversion section, to execute computation processing in order to estimate data information included in the received signal light; and a data discrimination section that executes discrimination processing of received data, based on a computation result of the digital computing section.

Furthermore, the difference in the optical frequencies between the orthogonal polarization components of the local oscillator light are set to be smaller than two times the band width of the received signal light, and larger than a light source spectrum line width of the received signal light and a light source spectrum line width of the local oscillator light.

In the coherent optical receiver of the above configuration, the local oscillator light having orthogonal polarization components in which the optical frequencies are different to each other, is output from the local oscillator light generation section to the combining section, and combined with the received signal light, and the combined light is converted to an electrical signal in the photoelectric conversion section. As a result, the intermediate frequency signals due to the beat of the respective orthogonal polarization components of the local signal light and the received signal light are respectively generated. By setting the optical frequency difference between the orthogonal polarization components of the local oscillator light to be smaller than two times the band width of the received signal light and larger than the spectrum line width of the original light source that generates the received signal light and the spectrum line width of the light source that generates the local oscillator light, each of the electrical spectra of respective intermediate frequency signals overlap with each other. Then the intermediate frequency signals are converted into digital signals by the AD converting section, and computational processing using the respective digital signals is executed by the digital computing section, to thereby estimate data information included in the received signal light, and discrimination processing of the reception data is executed in the data discrimination section based on these computation results.

According to the abovementioned coherent optical receiver of the present invention, the intermediate frequency signals are AD converted and digital signal processing is executed, so that the optical angular frequency difference between the orthogonal polarization components of the local oscillator light can be set small. As a result, the band width required for the photoelectric conversion section and the like can be greatly reduced, and hence coherent reception is possible with a small size and simple configuration, without high speed signal light of for example 40 Gbit/s being dependent on the polarization state.

Other objects, features, and advantages of the present invention will become apparent from the following description of the embodiments, in conjunction with the appended drawings.

DETAILED DESCRIPTION OF THE INVENTION

Hereunder is a description of a best mode for carrying out the present invention, with reference to the appended drawings. Throughout all of the drawings the same reference symbols denote the same or equivalent parts.

Figure 1:
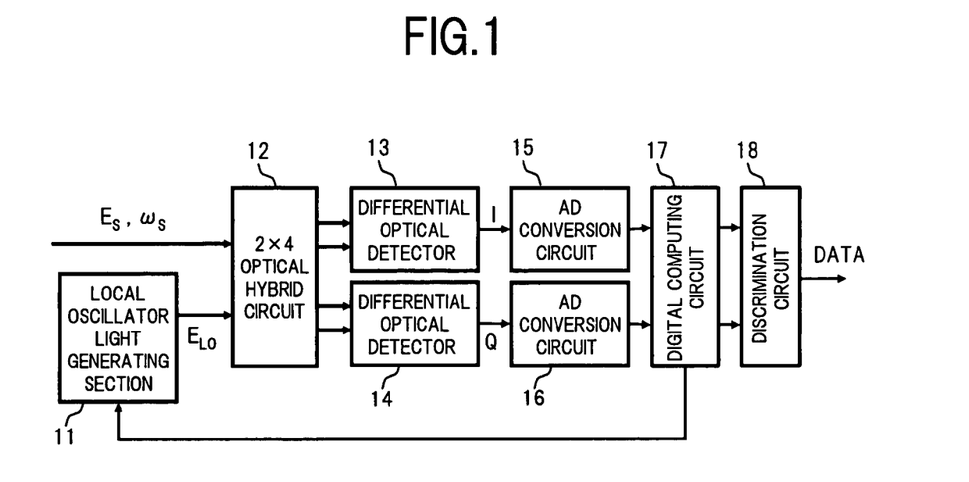
FIG. 1 is a block diagram showing a configuration of an embodiment of a coherent optical receiver according to the present invention.

FIG. 1 is a block diagram showing a configuration of an embodiment of a coherent optical receiver according to the present invention.

In FIG. 1, the coherent optical receiver comprises for example: a local oscillator light generating section 11, a 2×4 optical hybrid circuit 12 serving as a combining section, differential optical detectors 13 and 14 serving as a photoelectric conversion section, AD conversion circuits 15 and 16 serving as an AD conversion section, a digital computing circuit 17 serving as a digital computing section, and a discrimination circuit 18 serving as a data discrimination section.

The local oscillator light generating section 11 generates a local oscillator light $E_{LO}$ in which a polarization component of optical angular frequency $\omega_O$, and a polarization component of optical angular frequency $\omega_L+\omega_O$ orthogonal thereto are polarization multiplexed. The optical angular frequency difference $\omega_O$ between the orthogonal polarization components of the local oscillator light $E_{LO}$ is previously set so as to be smaller than two times the band width of the signal light $E_S$ received by the optical receiver, and larger than a spectrum line width (full width at half maximum) of an original light source that is used to generate the signal light $E_S$ in the optical transmitter (not shown in the figure) and the spectrum line width (full width at half maximum) of the original light source that is used to generate the local oscillator light $E_{LO}$.

Figure 2:
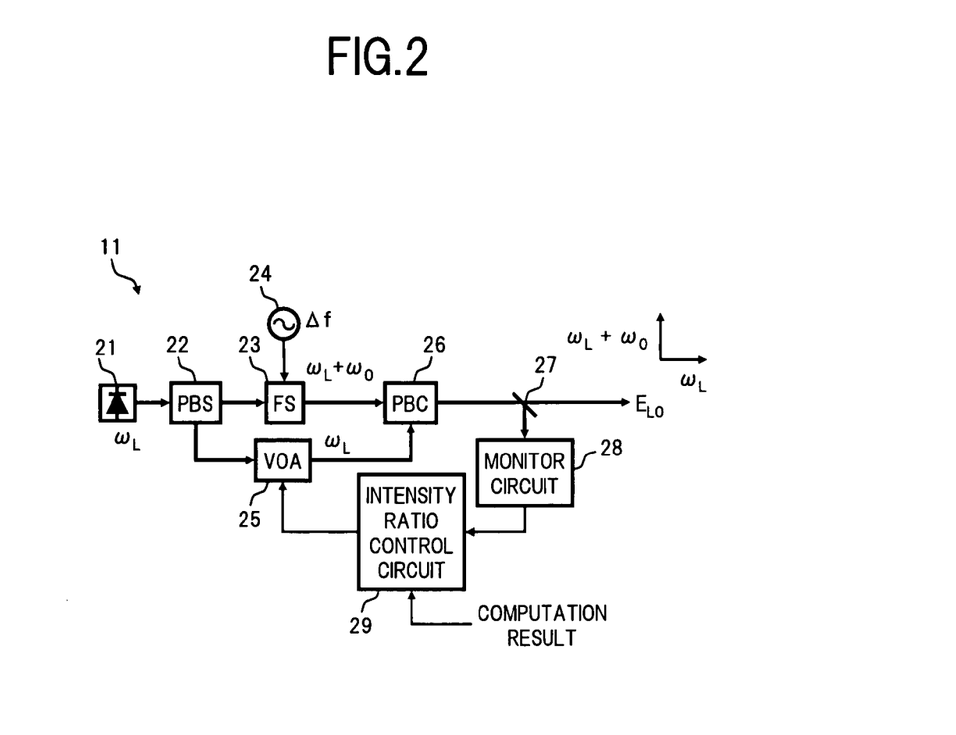
FIG. 2 is a block diagram showing a specific configuration example of a local oscillator light generating section in the above embodiment.

FIG. 2 is a block diagram showing a specific configuration example of the local oscillator light generating section 11. The local oscillator light generating section 11 has for example; a light source 21, a polarization beam splitter (PBS) 22, a frequency shifter (FS) 23, an oscillator 24, a variable optical attenuator (VOA) 25, a polarization beam combiner (PBC) 26, an optical divider 27, a monitor circuit 28, and an intensity ratio control circuit 29.

The light source 21 generates light of a constant polarization state, for example linear polarization having an optical angular frequency $\omega_L$. The spectral line width (full width at half maximum) of the light source 21 is for example approximately 100 kHz to 10 MHz.

The PBS 22 separates the output light from the light source 21 into two mutually orthogonal polarization components. In the case where the output light from the light source 21 is linear polarized light, the output light is input to the PBS 22 so that the polarization direction thereof becomes approximately 45 degrees with respect to the optical axis of the PBS 22. Furthermore, an optical isolator (not shown in the figure) may be positioned between the light source 21 and the PBS 22.

The frequency shifter 23 receives the input of one of the polarization components output from the PBS 22, and shifts the optical angular frequency of the input light by $\omega_O$, corresponding to an output signal from the oscillator 24. For the frequency shifter 23, it is possible to use a general FM modulator or acousto-optic modulator (AOM), or a single side band (SSB) modulator or the like.

The oscillator 24 operates at an oscillation frequency $\Delta f(=\omega_O/2\pi)$ corresponding to the optical angular frequency difference $\omega_O$ that is smaller than two times the signal band width, and larger than the spectrum line width of the signal light source and the spectrum line width of the local oscillator light source, and outputs an oscillation signal to the control terminal of the frequency shifter 23. To give a specific example of the frequency $\Delta f$, since in the case where the received signal light $E_S$ is DQPSK signal light of 40 Gbit/s, the signal band width becomes approximately 20 GHz, it is good if the frequency $\Delta f$ is smaller than 40 GHz being two times this, and larger than the spectrum width 100 kHz to 10 MHz (the spectrum width of the signal light source is also basically of the same order) of the light source 21 inside the aforementioned local oscillator light generating section 11. Therefore the frequency $\Delta f$ in this case can be set for example to within a range of 100 MHz to 1 GHz. However, the present invention is not specifically limited to the above.

The VOA 25 takes the input of the other polarization component output from the PBS 22, and attenuates the intensity of the input light. The attenuation amount of the VOA 25 is variably controlled in accordance with an output signal from the intensity ratio control circuit 29 described later.

The PBC 26 takes the input of the polarization component of optical angular frequency $\omega_L+\omega_O$ output from the frequency shifter 23, and the polarization component of optical angular frequency $\omega_L$ output from the VOA 25, and generates a local oscillator light $E_{LO}$ in which the respective polarization components are polarization multiplexed.

Between each of the above light source 21, the PBS 22, the frequency shifter 23, the VOA 25, and the PBC 26 is optically coupled using such techniques as polarization maintaining fibers, optical waveguides, free-space optics, or the like, such that the polarization state of the light propagated between these is maintained.

The optical divider 27 branches a part of the local oscillator light $E_{LO}$ output from the PBC 26 as monitor light, and outputs this to the monitor circuit 28.

The monitor circuit 28 uses the monitor light from the optical divider 27, and detects the intensity (amplitude) of the respective polarization components of the optical angle frequencies $\omega_L$ and $\omega_L+\omega_O$ included in the local oscillator light $E_{LO}$, and monitors the ratio thereof.

The intensity ratio control circuit 29 generates a control signal for changing the attenuation amount of the VOA 25, depending on the monitor result of the monitor circuit 28 and the calculation result of the digital computing circuit 17 described later, and outputs the control signal to the VOA 25. Details of the control of the VOA 25 by the intensity ratio control circuit 29 are described later.

The 2×4 optical hybrid circuit 12 (FIG. 1) is an optical 90 degree hybrid circuit having two input ports and four output ports. To one of the input ports is input the received signal light $E_S$ of optical angular frequency $\omega_S$ input to the optical receiver from an optical transmitter (not shown in the figure) via an optical transmission line or the like, and to the other input port is input the local oscillator light $E_{LO}$ output from the local oscillator light generating section 11. The 2×4 optical hybrid circuit 12 combines the input received signal light $E_S$ and the local oscillator light $E_{LO}$, and outputs light of two groups with optical phases 90 degrees different to each other. Here the phases of the light respectively output from two output ports of one group positioned at the top in FIG. 1, become 0 degrees and 180 degrees, and the phases of the light respectively output from two output ports of the other group positioned at the bottom in the figure, become 90 degrees and 270 degrees.

The differential optical detector 13 receives the respective lights with optical phases of 0 degrees and 180 degrees output from the 2×4 optical hybrid circuit 12, and performs differential photoelectric conversion detection (balanced detection). Furthermore, the differential optical detector 14 receives the respective lights with optical phases of 90 degrees and 270 degrees output from the 2×4 optical hybrid circuit 12, and performs differential photoelectric conversion detection. Each of the received signals detected by the differential optical detectors 13 and 14 become amplified (normalized) by an automatically gain-controlled (AGC) amplifier (not shown in the figure) or the like.

The AD conversion circuits 15 and 16 convert the analog received signals respectively output from the differential optical detectors 13 and 14 into digital signals, and output these to the digital computing circuit 17.

The digital computing circuit 17 uses the digital signals output from the AD conversion circuits 15 and 16, and executes computational processing in accordance with an algorithm described in detail later, to thereby perform signal processing using the local oscillator light $E_{LO}$ in which the optical angular frequency difference $\omega_O$ between the orthogonal polarization components is set in a range as mentioned before, in order to be able to coherent receive the signal light $E_S$.

The discrimination circuit 18 performs digital discrimination processing of the received signal based on the calculation result in the digital computing circuit 17, and outputs a received data signal DATA showing the result.

Next is a description of the operation of the coherent optical receiver of the abovementioned configuration.

At first is a detailed description of the operation principle of the optical receiver. The signal light $E_S$ received by the optical receiver is expressed for example by an electric field vector $E_S(t)$ shown in the following equation (1).

$$\vec{E}_S(t) = \{A_x \vec{e}_x + A_y \vec{e}_y\} e^{j(\omega t + \phi(t))} s(t) \tag{1}$$

In the above equation (1), s(t) represents a signal vector corresponding to data of the received signal light, $e_x(t)$ represents an x direction unit vector, $e_y(t)$ represents a y direction unit vector, $A_x$ represents the amplitude of the x polarization component of the received signal light, $A_y$ represents the amplitude of the y polarization component of the received signal light, $\omega$ represents the average angular frequency ($=\omega_S$) of the received signal light, $\phi(t)$ represents the optical phase fluctuation of the received signal light, t represents time, and j represents an imaginary unit.

Furthermore, the local oscillator light $E_{LO}$ output from the local oscillator light generating section 11 is expressed for example by an electric field vector $E_{LO}(t)$ shown in the following equation (2).

$$\vec{E}_{LO}(t) = (A_{LO\_x} \vec{e}_x + A_{LO\_y} e^{j\Delta\omega t} \vec{e}_y) e^{j(\omega_{LO} t + \phi_{LO}(t) + \phi_0)} \tag{2}$$

In the above equation (2), $A_{LO\_x}$ represents the amplitude of the x polarization component of the local oscillator light, $A_{LO\_y}$ represents the amplitude of the y polarization component of the local oscillator light, $\omega_{LO}$ represents the average optical angular frequency of the local oscillator light, $\Delta\omega t$ represents the optical angular frequency difference ($=\omega_O$) between the orthogonal polarization components of the local oscillator light, $\phi_{LO}(t)$ represents the optical phase fluctuation of the local oscillator light, and $\phi_0$ represents the initial phase of the local oscillator light.

The received signal light $E_S$ and local oscillator light $E_{LO}$ mentioned above are combined by the 2×4 optical hybrid circuit 12, and are then photoelectric converted in the differential optical detectors 13 and 14. Furthermore, the complex current amplified by the AGC amplifier and normalized, is defined by the following equation (3). The real part I of the complex current corresponds to the output of one differential photodetector 13, and the imaginary part Q corresponds to the output of the other differential photodetector 14.

$$\begin{aligned} I + jQ &= a\vec{E}_S \cdot \vec{E}_{LO}^* \\ &= \{A_x' e^{j(\omega t + \phi(t) - \omega_{LO} t - \phi_{LO}(t) - \phi_0)} + \\ &\quad A_y' e^{j(\omega t + \phi(t) - \omega_{LO} t - \phi_{LO}(t) - \phi_0 - \Delta\omega t)}\} s(t) \\ &\equiv (A_x' e^{j\theta_x(t)} + A_y' e^{j\theta_y(t)}) s(t) \\ &= e^{j\theta_x(t)} (A_x' + A_y' e^{j(\theta_y(t) - \theta_x(t))}) s(t) \\ &= e^{j\theta_x(t)} (A_x' + A_y' e^{-j\Delta\omega t}) s(t) \end{aligned} \tag{3}$$

In the above equation (3), the phase difference of the x polarization component is represented by $\theta_x(t)$, and the phase difference of the y polarization component is represented by $\theta_y(t)$. Furthermore, $A_x'$ and $A_y'$ satisfy the relationship of the following equation (4) with the gain of the AGC amplifier as g (positive number).

$$A_x'^2 + A_y'^2 = 1$$

$$A_x' = g A_x A_{LO\_x}$$

$$A_y' = g A_y A_{LO\_y} \tag{4}$$

If compensation is performed for the frequency difference and the relative phase noise between the original carrier wave of the received signal and the local oscillator light, by focusing on the term originating in the x polarization component, the complex current I'+jQ' after this compensation is expressed by the following equation (5).

$$\begin{aligned} I' + jQ' &= \vec{E}_S \cdot \vec{E}_{LO}^* \cdot e^{-j\theta_x(t)} \\ &= (A_x' + A_y' e^{-j\Delta\omega t}) s(t) \end{aligned} \tag{5}$$

Here the above compensation is described. The complex current signal output from the differential optical detectors 13 and 14 possibly includes a frequency discrepancy between the local oscillator light and the carrier wave of the signal light, and/or a polarization rotation due to phase shift. Therefore it is necessary to carry out compensation of these. As a technique related to this compensation, for example in the case of a method in for example document: D-S. Ly-Gagnon et al., "Unrepeated 210-km transmission with coherent detection and digital signal processing of 20-Gb/s QPSK signal," OFC 2005, OTuL4, where the received signal light is 4 value phase shift keyed (PSK), there is shown a method of calculating the phase difference $\theta(t)$ between the received signal light and the local oscillator light. By means of this expansion, in the case of the PSK format for m values, it is shown that this can be approximately calculated in accordance with the relationship of the following equation (6).

$$\theta(t) \cong \frac{1}{m} \frac{1}{\Delta t} \int_{-\Delta t}^{t} \arg\{(I + jQ)^m\} dt \tag{6}$$

Therefore, in the present invention, referring to the relationship of the above equation (6), the approximations for the phase difference $\theta_x(t)$ of the x polarization component contained in the aforementioned equation (3) and the phase difference $\theta_y(t)$ of the y polarization component are respectively calculated in accordance with the following equation (7).

$$\theta_x(t) \cong \frac{1}{m} \frac{1}{\Delta t} \int_{-\Delta t}^{t} \arg\{(I+jQ)^m\} dt \quad (7)$$

$$\theta_y(t) \cong \frac{1}{m} \frac{1}{\Delta t} \int_{-\Delta t}^{t} \arg\{\{(I+jQ)e^{-j\Delta\omega t}\}^m\} dt$$

At this time, it is necessary that the integral duration $\Delta t$ in the above equation (7) is sufficiently larger than the inverse of the frequency difference between the orthogonal polarization components of the local oscillator light, that is to say, $2\pi/\Delta\omega$, and is sufficiently smaller than the inverse of the maximum value of the frequency difference between the average frequency of the received signal light and the average frequency of the local oscillator light, that is to say, $1/\max(\omega_{LO}, \omega_S)/2\pi$. In the case where the received signal light is the DQPSK format, the value of m is 4.

If the respective approximations of $\theta_x(t)$ and $\theta_y(t)$ are calculated by the above equation (7), the ratio of $A_x'$ and $A_y'$ included in the aforementioned equation (3) is approximately obtained from the following equation (8);

$$A_x':A_y' \cong \int_{-T}^{T} |e^{-j\theta_x(t)}(I+jQ)| dt : \int_{-T}^{T} |e^{-j\theta_y(t)}(I+jQ)| dt \quad (8)$$

where the integral time T in the above equation (8) must be sufficiently larger than the inverse number $2\pi/\Delta\omega$ of the frequency difference between the orthogonal polarization components of the local oscillator light.

By using the ratio of $A_x'$ and $A_y'$ obtained in accordance with the relationship of the above equation (8), and the relationship of $A_x'^2 + A_y'^2 = 1$ shown in the aforementioned equation (4), it is possible to calculate the value for $A_x'$ and $A_y'$.

Consequently, if the values for $A_x'$ and $A_y'$ are known, the respective values for I' and Q' in the aforementioned equation (5) are known by the current value output from the respective differential optical detectors 13 and 14. Furthermore, since the value $\Delta\omega t$ is known from the value $(\Delta\omega = \omega_O = 2\pi\Delta f)$ corresponding to the frequency $\Delta f$ of the oscillator 24, the value for the signal vector s(t) can be calculated from the following equation (9) in which the relationship of equation (5) is solved for s(t), and the denominator is rationalized.

$$s(t) = \frac{I' + jQ'}{A_x' + A_y'e^{-j\Delta\omega t}} \quad (9)$$
$$= \frac{A_x' + A_y'e^{j\Delta\omega t}}{1 + 2A_x'A_y'\cos\Delta\omega t}(I' + jQ')$$

Therefore, by executing discrimination processing for the data in accordance with a threshold value corresponding to the modulation format for the received signal light, in the discrimination circuit 18, based on the calculation value of the signal vector s(t), it is possible to regenerate the received signal data.

However, in the relationship of the above equation (9), since this diverges under the condition shown in the following equation (10), it is necessary to take steps to avoid such a condition.

$$1 + 2A_x'A_y'\cos\Delta\omega t = 0 \Rightarrow \cos\Delta\omega t = -\frac{1}{2A_x'A_y'} \quad (10)$$

The condition for equation (10) to have a real number solution is expressed by the following equation (11)

$$1 \leq \frac{1}{2A_x'A_y'} \leq +1 \Rightarrow A_x'A_y' \geq \frac{1}{2} \text{ and } A_x'A_y' \leq -\frac{1}{2} \quad (11)$$

Here, from $A_x'^2 + A_y'^2 = 1$ shown in the aforementioned equation (4), there is the relationship $0 \leq A_x' \leq 1$, and $0 \leq A_y' \leq 1$. Therefore if this is considered, the conditions of the above equation (11) are only met for the case of the following equation (12).

$$A_x' = A_y' = \frac{\sqrt{2}}{2} \quad (12)$$

Consequently, in the case where the values of $A_x'$ and $A_y'$ calculated using the aforementioned equation (4) and equation (8) are close to the conditions of equation (12), it is possible to avoid the situation where the relationship of the aforementioned equation (9) diverges and thus the calculation of the signal vector s(t) becomes impossible, for example by changing the ratio of the amplitude $A_{LO-x}$ for the x polarization component of the local oscillator light, and the amplitude $A_{LO-y}$ for the y polarization component, Next, founded on the above operation principle, the specific operation of the optical receiver will be described.

In the optical receiver, in the local oscillator light generating section 11, light of optical angle $\omega_L$ output from the light source 21 is applied to the PBS 22, and separated into orthogonal polarization components. Then one of the polarization components (for example the y polarization component) is input to the frequency shifter 23, and the optical angular frequency is shifted by just $\omega_O$, and the other polarization component (for example the x polarization component) is input to the VOA 25, and the intensity (amplitude) is adjusted.

Next the polarization component of optical angular frequency $\omega_L + \omega_O$ output from the frequency shifter 23, and the polarization component of optical angular frequency $\omega_L$ output from the VOA 25 are input to the PBC 26, and a local oscillator light $E_{LO}$ for which the orthogonal polarization components with the optical angular frequency difference $\omega_O$ are polarization multiplexed is generated, and the local oscillator light $E_{LO}$ is sent to the 2×4 optical hybrid circuit 12, and together with this a part thereof is branched by the optical divider 27, and sent to the monitor circuit 28. In the monitor circuit 28, the ratio of the intensity (amplitude) of the respective polarization components included in the local oscillator light $E_{LO}$ is monitored, and the monitor result is transmitted to the intensity ratio control circuit 29. The intensity ratio control circuit 29, in the case where depending on the monitor result of the monitor circuit 28 and the computation result of the digital computing circuit 17, the computation value of $A_x'$ and $A_y'$ are close to the conditions of the aforementioned equation (12), changes the attenuation value of the VOA 25. As a result, the ratio of the intensity between the orthogonal polarization components of the local oscillator light $E_{LO}$ is changed, and the aforementioned divergence of equation (9) is avoided.

The local oscillator light $E_{LO}$ input to the 2×4 optical hybrid circuit 12 is combined with the received signal light $E_S$ having the optical angular frequency $\omega_S$, and respective beams with optical phases of 0 degrees and 180 degrees are output to the differential optical detector 13. Together with this, respective beams with optical phases of 90 degrees and 270 degrees are output to the differential optical detector 14.

In the differential optical detectors 13 and 14, the output beams from the 2×4 optical hybrid circuit 12 are subject to photoelectric conversion in a differential manner. As a result, a signal having an intermediate frequency $\omega_i$ due to the beat of the polarization component (x polarization component) of the optical angular frequency $\omega_L$ included in the local oscillation light $E_{LO}$, and the x polarization component of the received signal light $E_S$, and a signal Q having an intermediate frequency $\omega_i + \omega_O$ due to the beat of the polarization component (y polarization component) of the optical angular frequency $\omega_L + \omega_O$ included in the local oscillation light $E_{LO}$, and the y polarization component of the received signal light $E_S$, are output from the differential optical detector 13 and 14.

Figure 3:
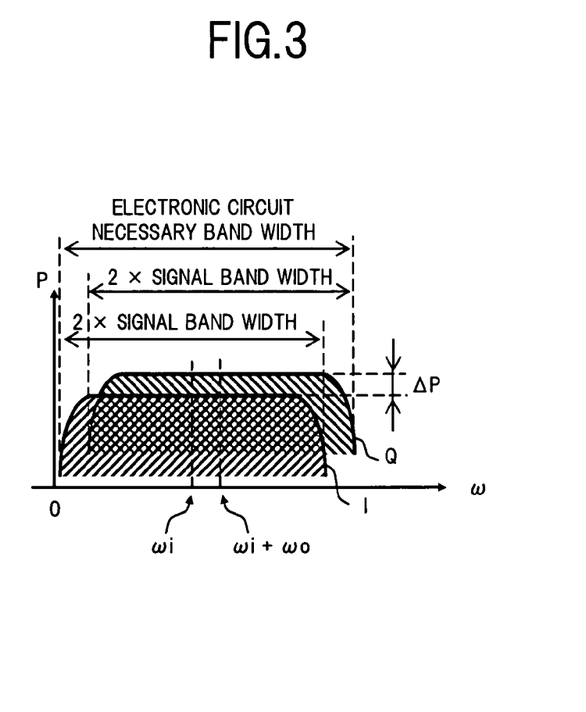
FIG. 3 is a diagram schematically showing an electrical spectrum of an intermediate frequency signal in the above embodiment.

FIG. 3 is a diagram schematically showing the electrical spectrum of the abovementioned intermediate frequency signals. In this manner, intermediate frequency signals are set so that the frequency difference is smaller than 2 times the signal band width, and is larger than the spectrum line width of the signal light source and the local oscillator light. Therefore each of the spectra overlaps with the other on the frequency axis. As a result, regarding the band width required for the differential optical detectors 13 and 14 and the electronic circuit positioned at a later stage from these, in the example of FIG. 3, it is sufficient if this is approximately 2 times the signal band width. Here, while not shown in the figure, in the case where the optical angular frequency $\omega_L$ of the local oscillator light is set so that the frequency $\omega_i$ becomes close to 0 Hz, the required bandwidth can be made narrow down to the same order of the signal band width. In a condition with the spectra of the aforementioned intermediate frequency signals are overlapping, then as with the case of the aforementioned conventional coherent optical receiver shown in FIG. 8, it is not possible to separate the intermediate frequency signals using the bandpass filter. However, in the present invention, individual separation is possible by digital signal processing the intermediate frequency signals in accordance with the abovementioned operation principle.

More specifically, the intermediate frequency signals I and Q output from the differential optical detectors 13 and 14 are AD converted at high speed in the AD conversion circuits 15 and 16, and a digital signal sequence corresponding to the intermediate frequency signals I and Q is input to the digital computing circuit 17. In the digital computing circuit 17, digital signal processing in accordance with a series of algorithms corresponding to the aforementioned equation (1) and equation (9) is executed, and the value of the signal vector s(t) is calculated. Furthermore, if the respective values of $A_x'$ and $A_y'$ obtained in this calculation step become close to the conditions of equation (12), this information is transmitted from the digital computing circuit 17 to the intensity ratio control circuit 29 inside the local oscillator light generating section 11, and the VOA 25 is controlled by the intensity ratio control circuit 29. As a result the situation where the ratio of the intensity between the orthogonal polarization components of the local oscillator light $E_{LO}$ changes, and equation (9) diverges so that calculation of the signal vector s(t) becomes impossible is avoided.

Then, when the calculation value of the signal vector s(t) in the digital computing circuit 17 is transmitted to the discrimination circuit 18, in the discrimination circuit 18, in accordance with a threshold value corresponding to the modulation format of the received signal light, discrimination processing as to which digital signal the computed value of the signal vector s(t) corresponds, is executed, and the discrimination result is output as received data DATA.

In the above manner, according to the present optical receiver, AD conversion of the received signal and digital signal processing are combined, and the setting of the optical angular frequency difference $\omega_O$ between the orthogonal polarization components of the local oscillator light $E_{LO}$ is optimized. As a result, compared to the aforementioned method of (III) of the conventional technology, the band width required for the differential optical detectors 13 and 14 and the like can be significantly decreased. Therefore it is possible to coherently receive high speed signal light of for example 40 Gbit/s or above without being dependent on the polarization condition. Furthermore, compared to the aforementioned methods of (I) and (II) of the conventional technology, coherent reception that is polarization independent can be realized by a simple configuration. Therefore it is possible to provide a small size optical receiver.

Figure 4:
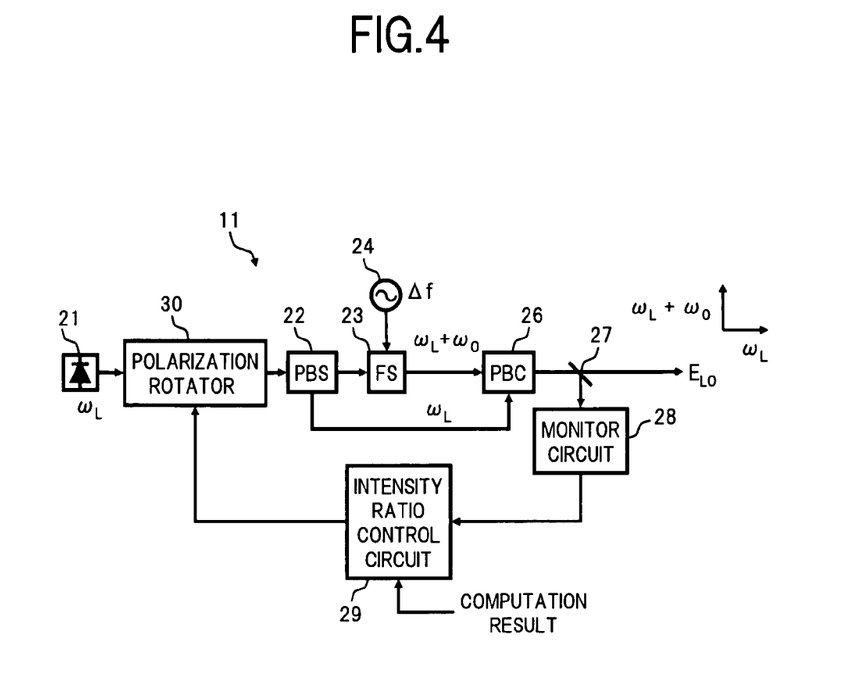
FIG. 4 is a block diagram showing another configuration example of a local oscillator light generating section related to the embodiment.

In the abovementioned embodiment, as a specific configuration of the local oscillator light generating section 11, an example was shown (FIG. 2) where the optical angular frequency of one polarization component was shifted by just $\omega_O$ using the frequency shifter 23, and the ratio of the amplitude between the orthogonal polarization components was controlled using the VOA 25. However, the configuration of the local oscillator light source of the present invention is not limited to this. For example, as shown in FIG. 4, instead of the VOA 25, it is possible to arrange a polarization rotator 30 between the light source 21 and the PBS 22, and control the polarization rotator 30 in accordance with an output signal from the intensity ratio control circuit 29, to thereby change the ratio of the intensity (amplitude) between the orthogonal polarization component separated by the PBS 22.

Figure 5:
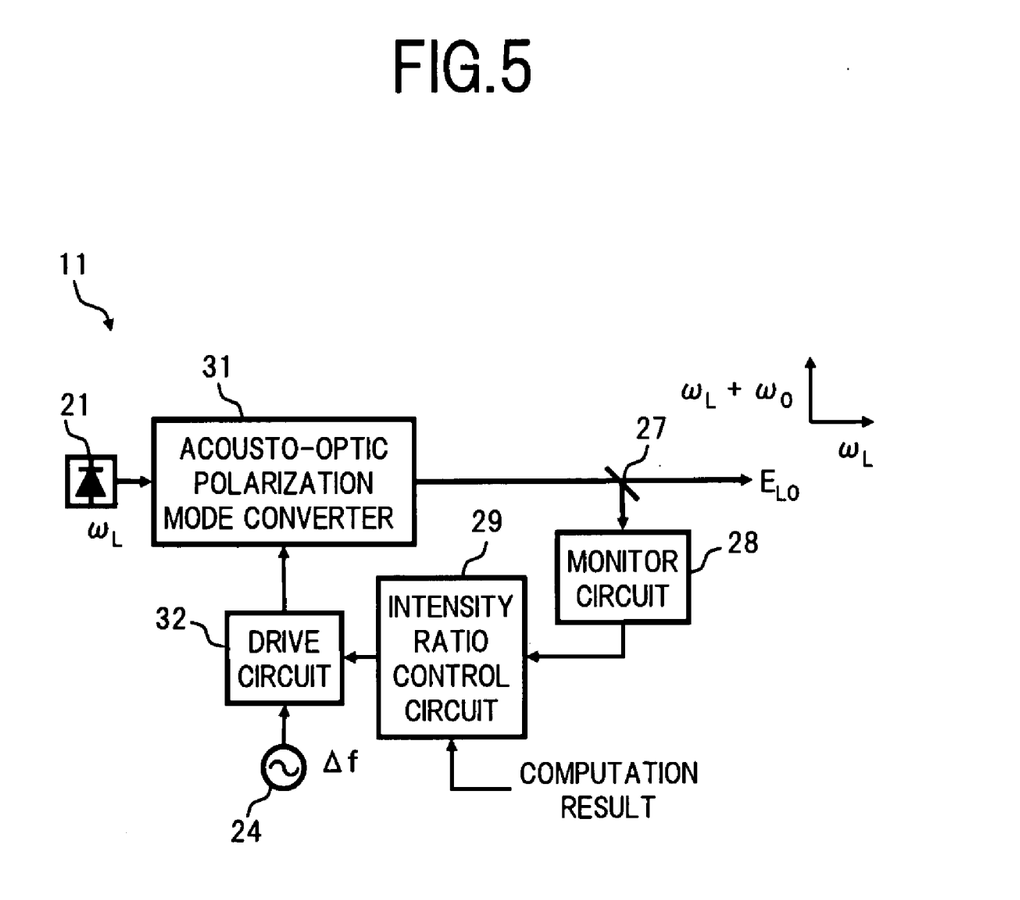
FIG. 5 is a block diagram showing a different configuration example of a local oscillator light generating section related to the embodiment.

Furthermore, as shown in for example in FIG. 5, it is possible to have a configuration where the output light from the light source 21 is applied to an acousto-optic polarization mode converter 31, to thereby generate the local oscillator light $E_{LO}$ including the orthogonal polarization components of the optical angle frequencies $\omega_L$ and $\omega_L + \omega_O$, and for which the intensity ratio between the orthogonal polarization components is controlled. In this case, the output signal from the oscillator 24 that is oscillation operated at a frequency $\Delta f$ is applied to a drive circuit 32 that drives the acousto-optic polarization mode converter 31, and the power of the drive signal output from the drive circuit 32 is controlled corresponding to a control signal from the intensity ratio control circuit 29. As a result, local oscillator light $E_{LO}$ similar to the case of the aforementioned configuration example shown in the FIG. 2 or FIG. 4 is output from the acousto-optic polarization mode converter 31. Regarding the acousto-optic polarization mode converter 31, it is possible to use one such as disclosed for example in document: David A. Smith et al., "Integrated-optic acoustically-tunable filters for WDM networks", IEEE Journal on Selected Areas in Communications, Vol. 8, No. 6, Aug. 1990. By applying a local oscillator light generating section 11 which uses the above acousto-optic polarization mode converter 31, the configuration is further simplified. Therefore it is possible to provide an even smaller optical receiver.

Furthermore, in the abovementioned embodiment, the example is given where, in the digital computing circuit 17, the digital signal processing is executed in accordance with a series of algorithms corresponding to the above-mentioned equations (1) through (9). However, the algorithm of the digital signal processing in the present invention is not limited to the abovementioned example. In relation to this, by applying other algorithms and executing digital signal processing, then if it is not necessary to consider the aforementioned divergence conditions of equation (9), it is also possible to simplify the configuration for changing the intensity ratio between the orthogonal polarization components of the local oscillator light (for example in the configuration of FIG. 2, the VOA 25, the optical divider 27, the monitor circuit 28, and the intensity ratio control circuit 29).

Next, as an application example of the abovementioned optical receiver, is a description of an apparatus (coherent optical receiver) in which the light source inside the local oscillator light source is used in common with the signal light source on the transmission side.

Figure 6:
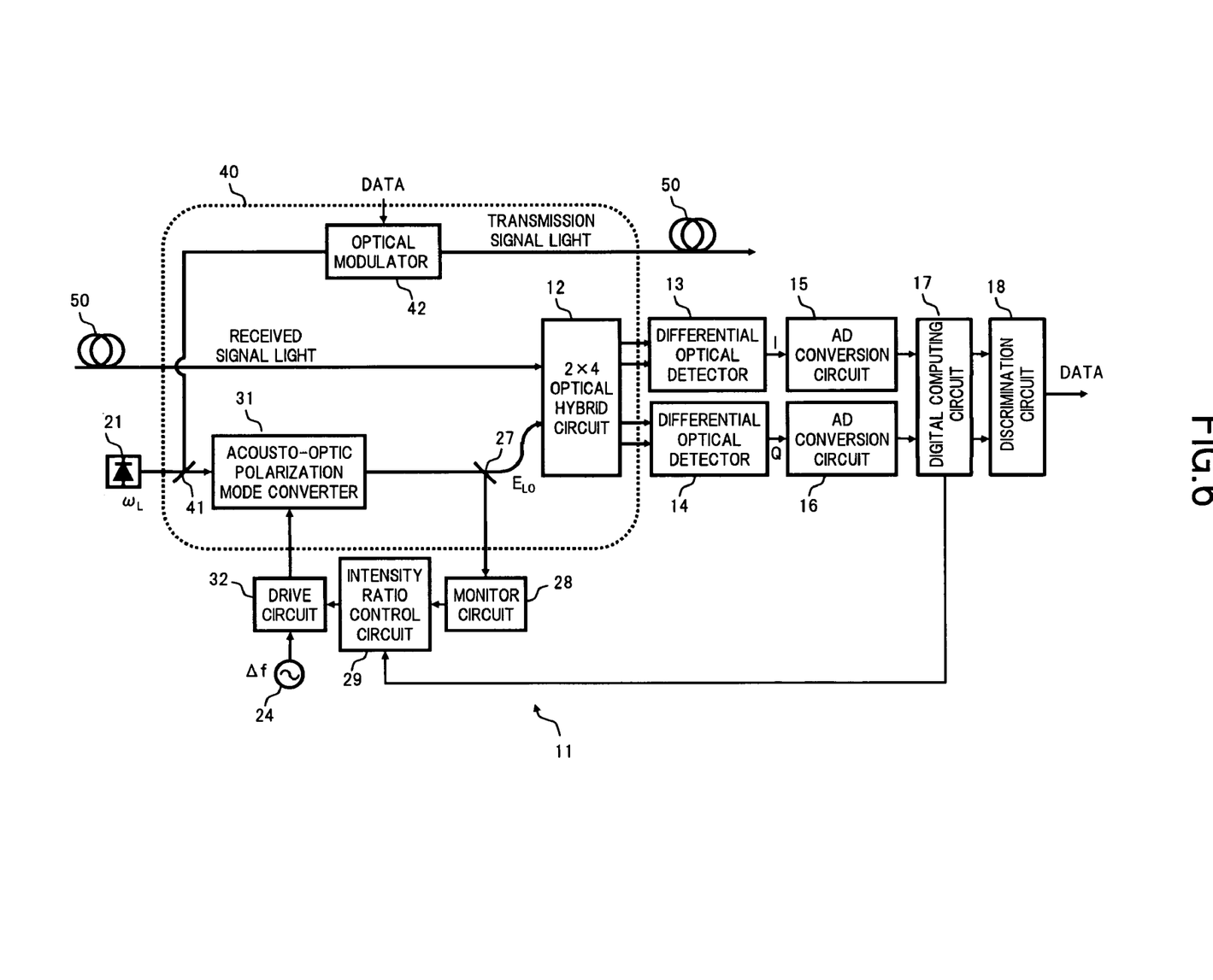
FIG. 6 is a block diagram showing a configuration example of a coherent optical receiver to which the embodiment is applied.

FIG. 6 is a block diagram showing a configuration of the above-mentioned coherent optical receiver. In this coherent optical receiver, a configuration that uses for example the aforementioned acousto-optic polarization mode converter 31 shown in the FIG. 5 as the local oscillator light generating section 11 is adopted, and a part of the light sent to the acousto-optic polarization mode converter 31 from the light source 21 of the local oscillator light generating section 11 is branched by an optical divider 41. Furthermore, the light that is branched by the optical divider 41 is sent to an optical modulator 42 which is operated in accordance with the transmit data DATA, and the signal light modulated in the optical modulator 42 is sent to an optical transmission line 50. The configuration of other components other than the optical divider 41 and the optical modulator 42 is basically the same as for the aforementioned configurations shown in FIG. 1 and FIG. 5.

Figure 7:
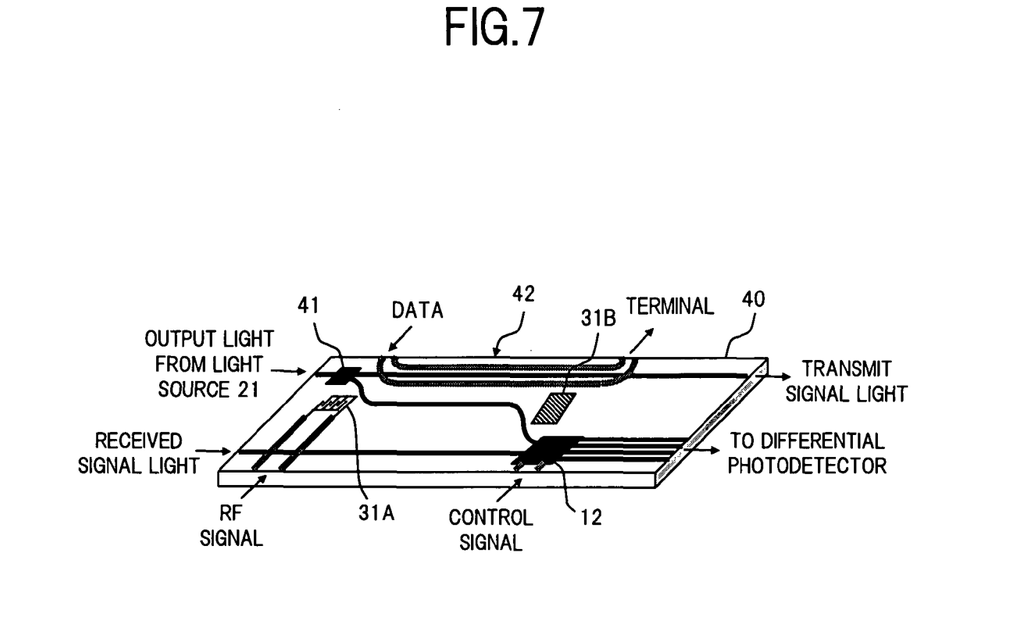
FIG. 7 is a perspective view showing an example of a PLC circuit applicable to the coherent optical receiver of FIG. 6.

In the aforementioned configuration shown in FIG. 6, a part 40 enclosed by the dotted line is capable of being a planar light wave circuit (PLC) in which a part thereof, or the whole, is integrated as an optical waveguide device. FIG. 7 is a perspective view showing an example of the abovementioned PLC. In this PLC, an optical waveguide is formed with a necessary pattern on a substrate of for example lithium niobate (LiNbO₃: LN) or the like, and the optical divider 41 is formed part way along the optical waveguide on which the output light from the light source 21 is incident. Furthermore, an interdigital transducer (IDT) 31A that generates a surface acoustic wave (SAW), and a SAW absorber 31B are formed in the vicinity of both ends of the optical waveguide that connects between one output port of the optical divider 41, and an input port on the local oscillator light side of the 2×4 optical hybrid circuit 12, and the acousto-optic polarization mode converter 31 is realized. Furthermore, a travelling wave type electrode to which is applied a modulating signal corresponding to the transmit data is formed on the optical waveguide that connects to the other output port of the optical divider 41, and the optical modulator 42 is realized.

In the coherent optical receiver of the above configuration, the received signal light that is propagated on the optical transmission line 50 and input to the signal light input port of the PLC is not dependent on the polarization condition as with the case of the aforementioned embodiment and is coherent received, and a part of the output light of the light source 21 that the local oscillator light generates is branched by the optical divider 41, and modulated in accordance with the transmission data by the optical modulator 42. As a result, signal light for transmission to the optical transmission line 50 is generated.

According to the above coherent optical receiver, by using the light source of the local oscillator light and the transmit signal light together, simplification and miniaturization of the configuration can be achieved. Furthermore, by adopting a PLC in which the 2×4 optical hybrid circuit 12, the acousto-optic polarization mode converter 31, the optical divider 41, and the optical modulator 42 are integrated, it is possible to realize an extremely small size coherent optical receiver.

What is claimed is:

1. A coherent optical receiver that processes received signal light by a coherent reception system, comprising:
    a local oscillator light generating section that generates local oscillator light having orthogonal polarization components in which the optical frequencies are different to each other;
    a combining section that combines received signal light and local oscillator light output from said local oscillator light generating section;
    a photoelectric conversion section that converts a light combined in said combining section into an electrical signal;
    an AD conversion section that converts the electrical signal output from said photoelectric conversion section into a digital signal;
    a digital computing section that uses a digital signal output from said AD conversion section, to execute computation processing in order to estimate data information included in said received signal light; and
    a data discrimination section that executes discrimination processing of received data, based on a computation result of said digital computing section,
    wherein the difference in the optical frequencies between the orthogonal polarization components of said local oscillator light are smaller than two times the band width of said received signal light, and larger than a light source spectrum line width of said received signal light and a light source spectrum line width of said local oscillator light, and
    in said local oscillator light generating section, a ratio of intensity between said orthogonal polarization components is variable, and
    said local oscillator light generating section comprises:
        a light source;
        an orthogonal polarization component section that changes an output light from said light source into the local oscillator light having orthogonal polarization components which have different frequencies;
        a monitor circuit that monitors the ratio of the intensity between the orthogonal polarization components; and
        an intensity ratio control circuit that controls the ratio of the intensity between the orthogonal polarization components depending on a monitor result of said monitor circuit and a calculation result of said digital computing section.

2. A coherent optical receiver according to claim 1, wherein one polarization component of said local oscillator light has an optical frequency such that an intermediate frequency due to a beat with said received signal light becomes close to 0 Hz.

3. A coherent optical receiver according to claim 1, wherein said orthogonal polarization component section comprises:
    a polarization beam splitter that separates the output light from said light source into two mutually orthogonal polarization components;
    a frequency shifter that shifts the frequency of one of the polarization components output from said polarization beam splitter;
    a variable optical attenuator that attenuates the intensity of the other polarization component output from said polarization beam splitter; and
    a polarization beam combiner that polarization multiplexes the output light from said frequency shifter and the output light from said variable optical attenuator, said monitor circuit that monitors the ratio of the intensity between the orthogonal polarization components polarization multiplexed by said polarization beam combiner, and said intensity ratio control circuit that controls said variable optical attenuator depending on a monitor result of said monitor circuit and a calculation result of said digital computing section.

4. A coherent optical receiver according to claim 1, wherein said orthogonal polarization component section comprises:

a polarization rotator that rotates the polarization direction of the output light from said light source;

a polarization beam splitter that separates the output light from said polarization rotator into two mutually orthogonal polarization components;

a frequency shifter that shifts the frequency of one of the polarization components output from said polarization beam splitter; and a polarization beam combiner that polarization multiplexes the other polarization component output from said polarization beam splitter and the output light from said frequency shifter, said monitor circuit that monitors the ratio of the intensity between the orthogonal polarization components polarization multiplexed by said polarization beam combiner, and said intensity ratio control circuit that controls said polarization rotator depending on a monitor result of said monitor circuit and a calculation result of said digital computing section.

5. A coherent optical receiver according to claim 1, wherein said orthogonal polarization component section comprises:

an acousto-optic polarization mode converter to which is input the output light from said light source; and a drive circuit that drives said acousto-optic polarization mode converter, said monitor circuit that monitors the ratio of the intensity between the orthogonal polarization components output from said acousto-optic polarization mode converter, and said intensity ratio control circuit that controls the power of a drive signal output from said drive circuit depending on a monitor result of said monitor circuit and a calculation result of said digital computing section.

* * * * *